April 25, 1967 R. H. HALLENDORFF 3,316,549
RADOME PHASE COMPENSATING SYSTEM
Filed March 16, 1966
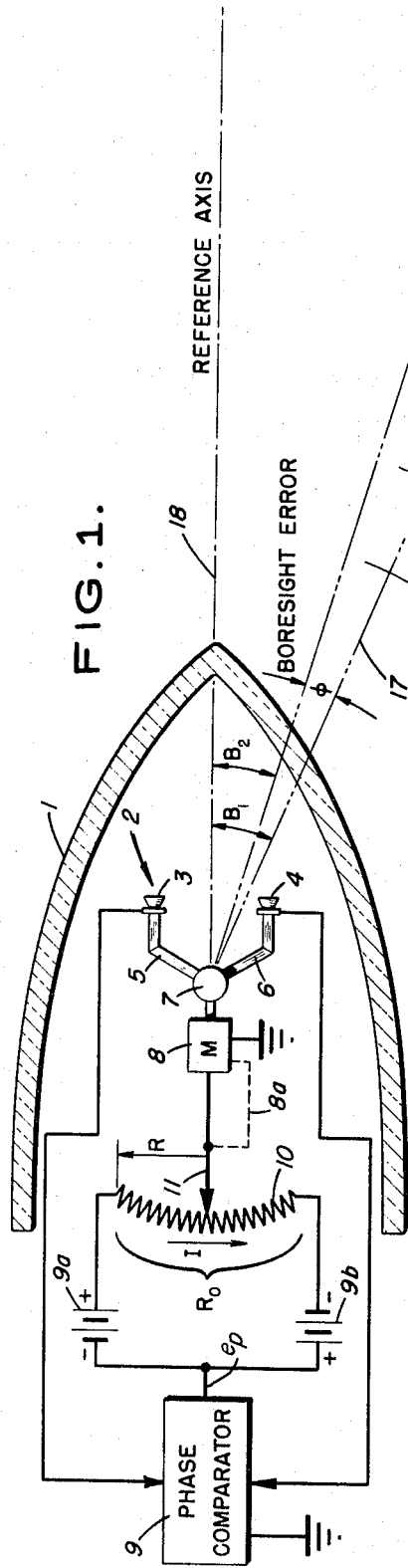
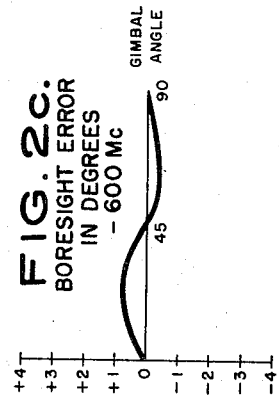
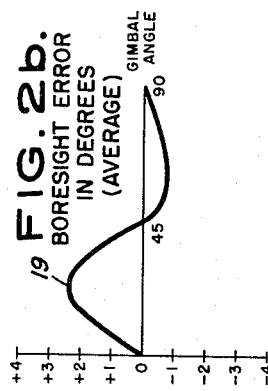
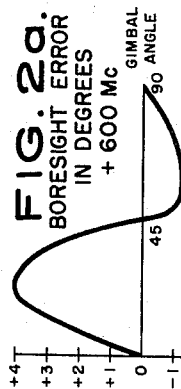
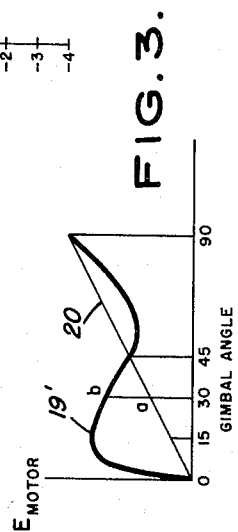
INVENTOR
RICHARD H. HALLENDORFF
BY
ATTORNEY

United States Patent Office 3,316,549
Patented Apr. 25, 1967

3,316,549
RADOME PHASE COMPENSATING SYSTEM
Richard H. Hallendorff, Silver Spring, Md., assignor to the United States of America as represented by the Secretary of the Navy
Filed Mar. 16, 1966, Ser. No. 536,591
6 Claims. (Cl. 343—7.4)

This application is a continuation-in-part of my co-pending and commonly assigned application, Ser. No. 407,601, filed Oct. 29, 1964, which has been abandoned.

This invention relates generally to error compensating systems for radar devices and, more particularly, to a system for compensating for the so-called boresight error produced by the refractice effects of a radome in an aircraft radar or missile radar guidance system.

Radar systems, adapted for use on high performance aircraft or missiles, utilize an antenna which is enclosed within an aerodynamically shaped lens or radome and which is controlled to track a target, in angle, from information obtained from the antenna in response to radar energy received from the target. The antenna may, for example, be gimbal mounted on a movable platform so as to be freely rotatable, and this platform is then driven by a motor, in an attempt to position the antenna on target, in response to a control signal derived from the received radar energy. In such aircraft or missile radar systems, antenna pairs located in orthogonal planes are often employed for such angle tracking.

The relative location of the target is then sensed by detecting the phase difference that exists between received radar signals arriving at the respective antenna elements of an antenna pair; which phase difference is proportional to the angular displacement between the existing position or gimbal angle of the antenna structure (as measured from a predetermined reference line) and the position to which the antenna pair would have to be rotated to null the phase difference. To accomplish this desired positioning of the antenna structure, the systems heretofore proposed have utilized a phase comparator to develop an electrical signal, proportional to the angular displacement between the gimbal angle and the null position, which is applied to the motor to move the antenna structure to the desired position. This electrical signal has also been used, in missile guidance systems, to steer a missile towards a collision course with the target.

However, it has been observed that radar energy is refracted upon passing through a radome and results in the so-called boresight error. Obviously, unless this refractive effect is taken into account and compensated for, the accuracy of the aircraft radar and/or missile radar guidance system could be impaired. This is so because the phase comparator output will indicate a target angle different from the actual line of sight angle from the antenna to the target. This indicated angle thus includes the angular error in the system due to radome refraction which, in turn, depends upon the physical parameters of the radome. This angular error, which is the difference between the line of sight angle and the indicated target angle is known as the boresight error referred to above, while the slope of this error is known as an error slope.

It should be pointed out at this time that where a hemispherical radome is employed, of uniform thickness, the refractive error would be constant for all antenna pointing or gimbal angles and could easily be accounted for, without the need for additional compensating means. However, a hemispherical radome configuration is obviously impractical for high performance aircraft or missile applications, because of aerodynamic considerations, and therefore the radome must be streamlined or of projectile-shaped configuration. It has been found that it is difficult to eliminate the boresight error, in such streamlined radome systems, by changing the physical dimensions or parameters of the radome.

In view of the above, it is proposed in accordance with the present invention to provide for electrically compensating for the effect of boresight error in an aircraft radar or missile radar guidance system. More specifically, it is proposed in accordance with the present invention to utilize a non-linear circuit device in combination with the aforementioned phase comparator to produce a control signal which properly takes into account the refractive effects of the radome and which compensated or corrected control signal can subsequently be applied to an antenna driving motor to accurately position and maintain an aircraft radar antenna on line of sight to target and/or as feedback to adjust missile guidance system information so that the missile is accurately controlled to intercept the target. This non-linear device can, for example, be a non-linear tapped function generator potentiometer which is adjusted in accordance with empirically derived boresight error measurements for various gimbal angles of an antenna pair in a particular radome shape.

An object of the present invention, therefore, is to provide a correcting system which compensates for the refractive error caused by the radome in a radar system.

Another object of the present invention is to provide a means for accurately directing a radar antenna towards a target despite the presence of a refractive medium between the antenna and the target.

Other objects and many of the attendant advantages of this invention will be readily appreciated as the same becomes better understood by reference to the following detailed description when considered in connection with the accompanying drawings, wherein:

FIG. 1 is an illustration of one embodiment of the present invention as applied for accurately positioning a radar antenna in an aircraft tracking radar system;

FIGS. 2a, 2b, and 2c are graphs illustrating the typical variations in boresight error caused by the radome illustrated in FIG. 1 at various operating frequencies; and FIG. 3 is a graph illustrating the manner in which an antenna positioning control signal is adjusted, in accordance with the present invention, to compensate for the boresight error in the radar system of FIG. 1.

Referring to FIG. 1, a projectile-shaped radome 1, made of a suitable dielectric material, encloses a tracking radar unit 2. The unit 2 includes a pair of antenna elements 3 and 4 mounted on a pair of arms 5 and 6. The arms 5 and 6 are affixed to a gimbal-mounted platform 7 which is rotated in the plane of the antenna elements in response to the energization of a motor 8. The antenna elements 3 and 4 are electrically connected to a phase comparator 9, of any well-known design, which produces an output voltage signal proportional to the phase difference existing between the respective radar signals received by the antenna elements 3 and 4.

The output voltage from the phase comparator 9 is connected, via oppositely poled batteries 9a and 9b, across a non-linear circuit device such as a well-known tapped function generator potentiometer, for example, diagrammatically represented at 10–11 in FIG. 1. This potentiometer is adjusted, as will be described in detail hereinafter, in a non-linear manner in accordance with the known way in which the boresight error produced by radome 1 varies with existing antenna position or gimbal angle. The potentiometer arm 11 is driven by the antenna motor 8, as represented by the dotted line 8a, such that it picks off a voltage in accordance with existing antenna position or gimbal angle. For example, with the antenna pair pointing along the labelled reference axis, as shown in FIG. 1, the arm 11 is positioned at the center of the potentiometer 10.

In operation, the antenna pair 3 and 4 receives the radar energy from a target 12. Such target may, for example, be illuminated by energy from the antenna pair 3–4 of FIG. 1 or from some other source, such as a ground tracking station. The radar energy is then reflected in the form of plane wavefronts, such as the fronts 13–16, which are perpendicular to the line of sight 17 between the antenna pair and the target. As the wavefronts successively move toward the antenna pair, each wavefront will be received by each antenna element of the pair at a different time and, therefore, at a different phase. For example, in FIG. 1, the target 12 is located below a reference axis 18 and a wavefront will therefore be received by the antenna element 4 before being received by the antenna element 3. If the target were located above the reference axis 18, the antenna element 3 would be the first to receive the wave.

The precise location of the target 12 relative to the aircraft is determined by the angle $B_1$, in FIG. 1, measured between the reference axis 18 and the line of sight 17. The refraction of the radome 1, however, causes a distortion in the radar energy wave from target 12 and the phase comparator 9 will thus indicate the location of the target at an angle $B_2$, differing from the line of sight angle $B_1$ by the boresight error $\phi$, as seen at FIG. 1. The angle $B_2$ is shown as being less than the angle $B_1$ but may be greater, as it depends on the physical parameters of the radome and the frequency of the radar wave. Moreover, it should be noted in FIG. 1 that the antenna pair is shown as being directed or pointed along the reference axis 18 so that, as illustrated, the existing antenna pointing or gimbal angle is zero.

Referring to FIGS. 2a, 2b, 2c and 3, the manner in which the output voltage of the comparator 9 is properly adjusted to compensate for boresight error, before being applied to antenna driving motor 8, may be understood. More specifically, the present invention is designed to operate over a wide band of frequencies and typically utilizes a 1200 megacycle bandwidth. FIG. 2a illustrates, for a typically constructed radome, the observed variation in boresight error for varying gimbal angles when the radar is operated at the high side of the frequency band. More particularly, when the gimbal angle is zero, the boresight error is zero. As the gimbal angle is increased, the boresight error maximizes and again diminishes to zero at 45°. As the antenna pair is further rotated from 45° to 90°, the boresight error will change in polarity. The boresight error at the low end of the frequency band, illustrated at FIG. 2c, varies in a similar manner, but, its magnitude is shown as being slightly less for the lower operating frequency than the higher operating frequency, by way of example, since refraction is a function of frequency. The variation in boresight error occurs, as discussed above, because the radome is not hemispherically shaped and various portions thereof have differing radii of curvatures. Thus, the amount of refraction is different for various portions of the radome. FIG. 2b is a graph in which the line 19 illustrates the average boresight error over the operating range of frequencies of the radar system; i.e., line 19 represents the average of the boresight error curves of FIGS. 2a and 2c.

FIG. 3 is a graph illustrating the voltage picked off by the potentiometer arm 11 and applied to the motor 8. More specifically, line 20 illustrates the linear voltage which is produced by the phase comparator 9 and which would be applied to the motor 8 if there were no boresight error. In such a theoretical case, there would be no need for the non-linear potentiometer 10, since the voltage from the comparator would be linearly proportional to the difference between the line of sight angle $B_1$ and the existing gimbal angle (shown as zero in FIG. 1) and would move the antenna pair to the desired line of sight position. If the angle $B_1$ then varied due to relative movement between the antenna pair and the target, the linearly proportional voltage would also be varied correspondingly and, when applied to the motor 8, would cause the antenna to constantly track the target.

In spite of the boresight error, the antenna pair must be moved through an angle $B_1$ as the target moves relative to the antenna pair, if accurate tracking is to be attained. The voltage input to the motor 8 required to produce the desired angular rotation of the antenna pair through the angle $B_1$, in the presence of boresight error, is shown by the line 19′; having the same configuration as line 19 illustrated in the graph of FIG. 2b. To understand the general manner in which the voltage applied to the motor 8 is corrected for the refractive error introduced by the radome, let it be assumed that the target is sighted at an angle of 30°. If there were no boresight error, the comparator 9 would apply an output voltage (a), in FIG. 3, to the motor 8 and rotate the antenna pair through 30° to the target, at which time the phase comparator output voltage would null. The boresight error will, however, cause the phase comparator to produce a null voltage at 29°, while the target is located at an angle of 30°. In accordance with the present invention, however, combined effects of the batteries 9a and 9b and the non-linear characteristic of the potentiometer device 10 cause the arm 11 to pick off an adjusted voltage (b), in FIG. 3, which is then applied to the motor 8 and causes it to drive the antenna through 30° (to properly point along the line of sight 17), at which time the motor input voltage goes to zero and the antenna pair stops. A more detailed explanation of the operation of the compensating circuitry of FIG. 1 will now be given.

As previously mentioned, the phase comparator 9 produces an output voltage proportional to the phase difference between the respective radar signals received at antenna elements 3 and 4. Consequently, this output from the phase comparator 9 is also proportional to the difference between the indicated target angle $B_2$ and the existing antenna pointing or gimbal angle $\alpha$. Thus:

$$e_p = E_o(B_2 - \alpha) \qquad \text{(Equation 1)}$$

where, $e_p$ is the output voltage from the phase comparator; $E_o$ is a constant of proportionality having a voltage value equal to that of batteries 9a and 9b; and $\alpha$ is the existing antenna pointing or gimbal angle measured relative to reference axis 18 in FIG. 1.

This comparator output voltage $e_p$ is applied, via the batteries 9a and 9b, to the potentiometer 10. These batteries 9a and 9b are selected to supply $+E_o$ and $-E_o$ volts respectively to the potentiometer 10. Consequently, the current I flowing in the potentiometer 10 is defined by the following equation:

$$I = \frac{2E_o}{R_o} \qquad \text{(Equation 2)}$$

where, $R_o$ is the total resistance of the potentiometer 10.

The voltage $e_m$ which is picked off by the arm 11 and applied to the motor 8 is then defined by the following equation:

$$e_m = E_o + e_p - IR \qquad \text{(Equation 3)}$$

where, R is the resistance value of the potentiometer 10 above the arm 11.

As mentioned previously, the potentiometer is adjusted such that the value of R is defined by:

$$R = \frac{R_o}{2} - \frac{R_o}{2} f(\alpha) \qquad \text{(Equation 4)}$$

where, $f(\alpha)$ represents the known manner in which the boresight error $\phi$ varies as a function of gimbal angle $\alpha$.

Combining Equations 1, 2, 3 and 4, the expression for the voltage $e_m$ applied to the motor 8 is given by:

$$\begin{aligned}
e_m &= E_o(B_2 - \alpha) + E_o - \frac{2E_o}{R_o} \frac{(R_o)}{2}[1 - f(\alpha)] \\
&= E_o(B_2 - \alpha) + E_o - E_o + E_o f(\alpha) \\
&= E_o(B_2 - \alpha) + E_o f(\alpha) \qquad \text{(Equation 5)}
\end{aligned}$$

From FIG. 1 it will be noted that:

$$B_2 = B_1 - \phi = B_1 - f(\alpha) \quad \text{(Equation 6)}$$

Consequently, if Equation 6 is substituted into Equation 5, the expression for motor voltage $e_m$ becomes $$\begin{aligned} e_m &= E_0[B_1 - f(\alpha) + f(\alpha) - \alpha] \\ &= E_0(B_1 - \alpha) \end{aligned} \quad \text{(Equation 7)}$$

Accordingly this Equation 7 reveals that the motor voltage $e_m$ will energize the motor 8, to move the antenna elements 3 and 4, until $(B_1 - \alpha)$ becomes zero; i.e., until the antenna pointing or gimbal angle $\alpha$ coincides with the line of sight angle $B_1$, as is desired. In this manner, the antenna pair 3-4 of FIG. 1 will be made to at all times accurately track the target 12, even though boresight error $\phi$ still exists.

Obviously, many modifications and variations of the present invention are possible in the light of the above teachings. It is therefore to be understood that within the scope of the appended claims the invention may be practiced otherwise than as specifically described.

What is claimed is:

1. In a radar system including a rotatable antenna pair for receiving a wavefront from a target and a radome enclosing said antenna pair and producing a refractive effect on said wavefront prior to reception by said antenna pair, a phase compensating sub-system for compensating for the known manner in which said refractive effect varies as a function of the position of said antenna pair, said phase compensating system comprising, in combination, rotating means for rotating said antenna pair, phase comparator circuit means operably connected to said rotating means and to each antenna element of said antenna pair adapted to produce a control signal for said rotating means effective to cause said rotating means to rotate said antenna pair towards said target, in accordance with the phase difference of said wavefront as received by each antenna element of said antenna pair, and correcting circuit means conditioned in accordance with the known manner in which said refractive effect varies as a function of antenna pair position and operably connected to said phase comparator circuit means for correcting the control signal produced by said phase comparator circuit means to compensate for said refractive effect.

2. The phase compensating system specified in claim 1 wherein, said phase comparator circuit means is connected directly to each antenna element of said antenna pair for producing an output signal proportional to the phase difference of said wavefront as received by each antenna element of said antenna pair, and said correcting means is operably connected between the output of said phase comparator circuit means and said rotating means for correcting said output signal in accordance with the known manner in which said refractive effect varies as a function of the position of said antenna pair, said corrected output signal thereafter being applied as a control signal to said rotating means for causing said rotating means to rotate said antenna pair until it points directly to said target.

3. The phase compensating system specified in claim 2 wherein said correcting circuit means comprises a non-linear potentiometer device connected to be energized with the output signal from said phase comparator circuit means, said potentiometer device being designed in accordance with the known manner in which the refractive effect of said radome varies as a function of antenna pair position to correct said comparator output signal prior to application to said rotating means, so as to compensate for said refractive effect.

4. The phase compensating systems specified in claim 3 wherein, said rotating means comprises an antenna driving motor operably connected to be energized by the corrected signal produced by said potentiometer device to rotate said antenna pair, the valve of said corrected signal being proportional to the angular displacement between the existing position of said antenna pair and the position to which antenna pair must be rotated to point directly at said target, whereby said motor is energized to rotate said antenna pair until said antenna pair until said antenna pair points directly at target.

5. The phase compensating systems specified in claim 1 wherein said rotating means comprises a motor operably connected to rotate said antenna pair and adapted to be energized by said corrected output signal, whereby said motor rotates said antenna pair to point directly at said target.

6. The phase compensating system specified in claim 5 wherein said antenna pair is supported by a gimbal mounted platform, said platform being rotatable by said motor.

References Cited by the Examiner
UNITED STATES PATENTS 3,128,466  4/1964  Brown et al. _____ 343—18 X RODNEY D. BENNETT, *Primary Examiner.*

T. H. TUBBESING, *Assistant Examiner.*